(12) United States Patent
Safry et al.

(10) Patent No.: US 10,408,248 B1
(45) Date of Patent: Sep. 10, 2019

(54) SEALING PIN AND GROMMET FASTENER ACCOMMODATING TWO DIRECTIONAL OFFSET

(71) Applicant: Newfrey LLC, New Britain, CT (US)

(72) Inventors: Oday Amer Safry, Farmington Hills, MI (US); Jason A. Meyers, Shelby Township, MI (US); Matthew R. Polselli, Macomb Township, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 16/121,990

(22) Filed: Sep. 5, 2018

(51) Int. Cl.
| | |
|---|---|
| *F16L 5/00* | (2006.01) |
| *F16B 5/12* | (2006.01) |
| *F16B 5/06* | (2006.01) |
| *F16B 37/04* | (2006.01) |
| *B60R 16/02* | (2006.01) |

(52) U.S. Cl.
CPC ............ *F16B 5/126* (2013.01); *F16B 5/0657* (2013.01); *F16B 37/043* (2013.01); *B60R 16/0222* (2013.01)

(58) Field of Classification Search
CPC ... Y10T 16/05; Y10T 16/063; B60R 16/0222; B60R 16/0207; B60R 16/0215; H02G 3/22; H02G 3/0468; H02G 15/013; H02G 3/0481; F16L 5/10; F16B 5/0258; F16B 43/001; F16B 5/126; F16B 5/0651; H01R 13/5205; H01R 13/5208; H01B 17/24; H01B 17/583
See application file for complete search history.

(56) References Cited

U.S. PATENT DOCUMENTS

| | | | |
|---|---|---|---|
| 2,228,176 | A | 1/1941 | Miller |
| 4,002,821 | A | 1/1977 | Satoh et al. |
| 4,043,579 | A | 8/1977 | Meyer |
| 4,407,042 | A | 10/1983 | Schramme et al. |
| 4,458,552 | A | 7/1984 | Spease et al. |
| 4,594,040 | A | 6/1986 | Molina |

(Continued)

FOREIGN PATENT DOCUMENTS

| | | |
|---|---|---|
| EP | 0698741 A1 | 2/1996 |
| FR | 2554522 A1 | 5/1985 |

(Continued)

*Primary Examiner* — Chuck Y Mah
(74) *Attorney, Agent, or Firm* — Harness, Dickey & Pierce, PLC

(57) ABSTRACT

An inner housing defines a pin retaining receptacle elongated in an X-direction with entry ramps extending parallel to the X-direction. The inner housing is slidably coupled to an outer housing for movement in a Y-direction. The outer housing has an enclosed interior defined by outer housing walls extending from an outer housing flange. Resilient retention wings can extend outwardly from the outer housing walls without providing adjacent openings therethrough to facilitate water resistance. A water resistant seal is positionable between an outer housing flange and a first component to seal therebetween when the outer housing is coupled to the first component by the retention wings. Centering blades extend between the inner and outer housings to initially locate the pin retaining receptacle in a central position within the interior in a Y-direction and the centering blades are movable during insertion of the pin into the pin retaining receptacle.

16 Claims, 17 Drawing Sheets

(56) References Cited

U.S. PATENT DOCUMENTS

| | | |
|---|---|---|
| 4,626,620 A | 12/1986 | Plyler |
| 4,707,020 A | 11/1987 | Enokida et al. |
| 4,729,606 A | 3/1988 | Narita et al. |
| 4,768,907 A | 9/1988 | Gauron |
| 4,865,505 A | 9/1989 | Okada |
| 4,923,347 A | 5/1990 | Moryl et al. |
| 4,971,500 A | 11/1990 | Benoit et al. |
| 5,028,189 A | 7/1991 | Harley |
| 5,073,070 A | 12/1991 | Chang |
| 5,098,765 A | 3/1992 | Bien |
| 5,129,768 A | 7/1992 | Hoyle et al. |
| 5,387,065 A | 2/1995 | Sullivan |
| 5,429,467 A | 7/1995 | Gugle et al. |
| 5,484,175 A | 1/1996 | Teich et al. |
| 5,533,237 A | 7/1996 | Higgins |
| 5,536,125 A | 7/1996 | Gaw, Jr. |
| 5,542,158 A | 8/1996 | Gronau et al. |
| 5,606,784 A | 3/1997 | Hamamoto |
| 5,716,578 A | 2/1998 | Ichikawa et al. |
| 5,738,476 A | 4/1998 | Assimakopoulos |
| 5,806,139 A | 9/1998 | Anderson et al. |
| 5,890,831 A | 4/1999 | Kato |
| 6,048,147 A | 4/2000 | Arisaka et al. |
| 6,145,173 A | 11/2000 | Suzuki et al. |
| 6,196,756 B1 | 3/2001 | Leverger |
| 6,206,604 B1 | 3/2001 | Dembowsky et al. |
| 6,209,175 B1 | 4/2001 | Gershenson |
| 6,474,616 B2 | 11/2002 | Yamada et al. |
| 6,505,990 B1 | 1/2003 | Maughan |
| 6,530,714 B2 | 3/2003 | Schwarz |
| 6,553,615 B1 | 4/2003 | Hansen et al. |
| 6,560,819 B2 | 5/2003 | Mizuno et al. |
| 6,695,481 B1 | 2/2004 | Chen |
| 6,758,622 B2 | 7/2004 | Burton |
| 7,033,121 B2 * | 4/2006 | Kirchen ............... F16B 19/008 |
| | | 24/453 |
| 7,226,233 B2 | 6/2007 | SuBenbach et al. |
| 7,328,489 B2 * | 2/2008 | Leverger ............... F16B 5/0628 |
| | | 24/292 |
| 7,470,081 B2 | 12/2008 | Miyahara et al. |
| 7,740,432 B2 | 6/2010 | Harada |
| 7,861,384 B2 | 1/2011 | Baumgartner |
| 7,895,709 B2 * | 3/2011 | Shishikura ............. B60R 13/04 |
| | | 16/2.1 |
| 7,905,694 B2 | 3/2011 | van Walraven |
| 8,322,001 B2 | 12/2012 | Ehrhardt et al. |
| 8,613,414 B2 | 12/2013 | Rosemann et al. |
| 8,636,454 B2 | 1/2014 | Okada et al. |
| 8,950,043 B2 | 2/2015 | Hofmann et al. |
| 9,057,393 B1 | 6/2015 | Lawrence |
| 9,080,588 B2 | 7/2015 | Diez Herrera et al. |
| 9,140,294 B2 | 9/2015 | Burton |
| 9,150,120 B2 | 10/2015 | Antoine et al. |
| 9,303,665 B2 | 4/2016 | Steltz et al. |
| 9,550,441 B2 | 1/2017 | Aoyama et al. |
| 9,995,331 B2 | 6/2018 | Heimann et al. |
| 10,288,098 B2 * | 5/2019 | Meyers ................. F16B 5/0657 |
| 2008/0056816 A1 | 3/2008 | Sussenbach |
| 2009/0263210 A1 * | 10/2009 | Loewe ................. F16B 19/1081 |
| | | 411/553 |
| 2011/0113598 A1 * | 5/2011 | Hofmann ............ B60R 13/0206 |
| | | 24/458 |
| 2011/0219588 A1 | 9/2011 | Inoue |
| 2012/0131771 A1 | 5/2012 | Hofmann et al. |
| 2013/0014353 A1 | 1/2013 | Loewe et al. |
| 2013/0113632 A1 * | 5/2013 | Bernstein ............... G16H 50/20 |
| | | 340/870.02 |
| 2013/0149066 A1 * | 6/2013 | Handa .................... F16B 19/10 |
| | | 411/57.1 |
| 2014/0050548 A1 | 2/2014 | Loewe et al. |
| 2014/0053385 A1 | 2/2014 | Nielsen-Cole et al. |
| 2015/0211565 A1 | 7/2015 | Benedetti |
| 2015/0321622 A1 | 11/2015 | Dickinson et al. |
| 2016/0138646 A1 | 5/2016 | Elperman et al. |
| 2016/0258465 A1 | 9/2016 | Heimann et al. |
| 2017/0051778 A1 * | 2/2017 | Dickinson ............. B29C 45/006 |
| 2017/0284437 A1 * | 10/2017 | Landsberg ........... F16B 5/0642 |
| 2018/0050610 A1 | 2/2018 | Hattori et al. |
| 2018/0209463 A1 | 7/2018 | Glickman et al. |

FOREIGN PATENT DOCUMENTS

| | | |
|---|---|---|
| FR | 2740183 A1 | 4/1997 |
| JP | 2012087824 A | 5/2012 |
| JP | 2012167692 A | 9/2012 |

* cited by examiner

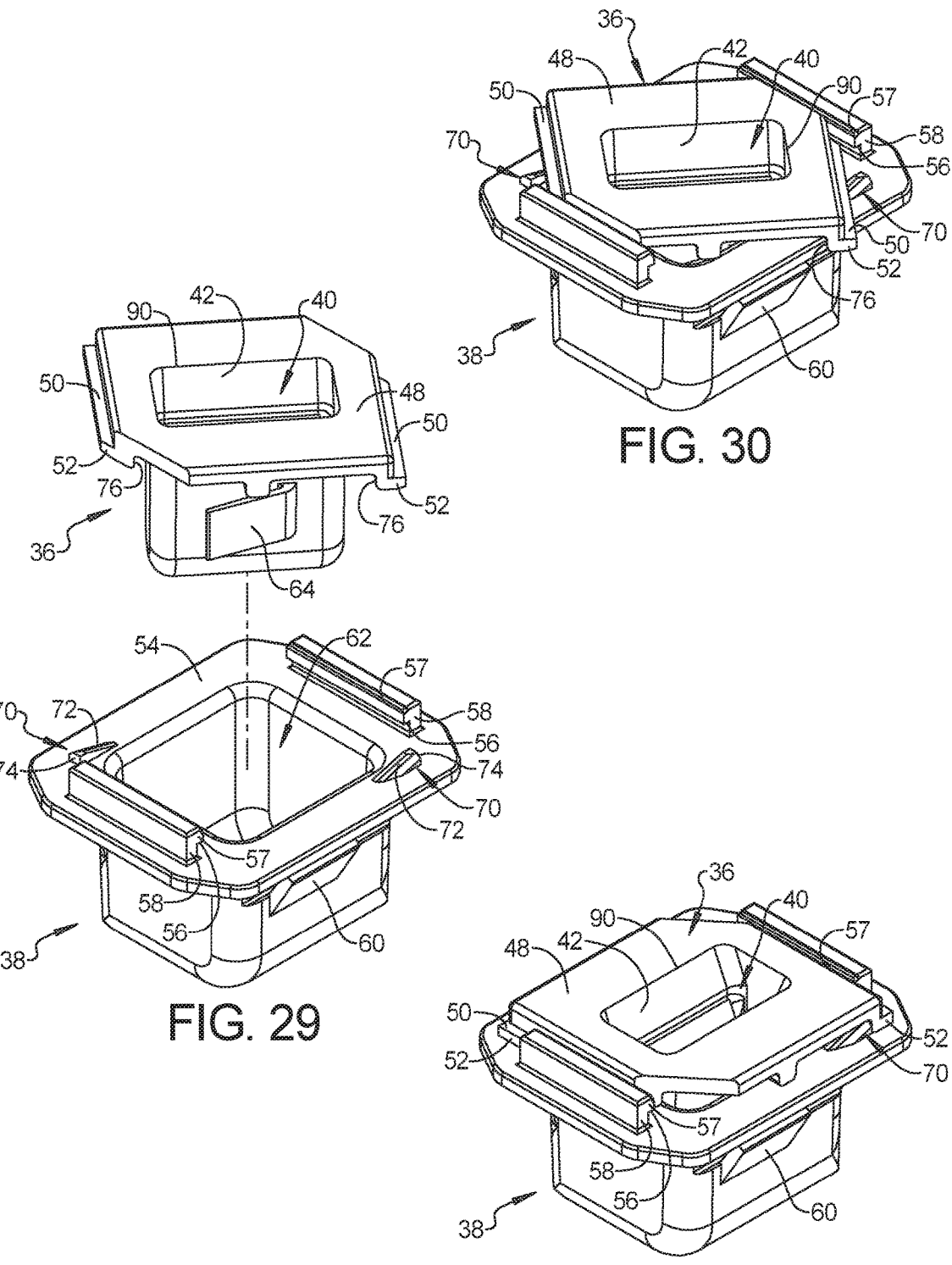

SEALING PIN AND GROMMET FASTENER ACCOMMODATING TWO DIRECTIONAL OFFSET

FIELD

The present disclosure relates to pin and grommet fasteners.

BACKGROUND

This section provides background information related to the present disclosure which is not necessarily prior art.

Pin and grommet fasteners are known in the art. Such pin and grommet fasteners typically require the pin to be centrally aligned in both X and Y directions with a pin receiving aperture of the grommet. In other words, a pin that is offset from the pin receiving aperture must be physically repositioned to align with the center of the pin receiving aperture of the grommet before the pin can be inserted into the pin receiving aperture. Some pin and grommet fasteners exist that allow for offset of the pin in one direction (e.g., in the X-direction), but the pin must still be repositioned relative to the grommet so the pin is centrally aligned with the pin receiving aperture in the other direction (e.g., in the Y-direction) to effect its insertion.

Such pin and grommet fasteners are not completely satisfactory, for example, where a plurality of pins are attached to a first component in fixed positions relative to each other and need to be inserted into pin receiving apertures of a corresponding plurality of grommets fixed to another component. As another example, such pin and grommet fasteners are not completely satisfactory where insertion of the pin into the grommet involves blind positioning and insertion of the pin in the grommet. Ease of pin insertion in both of these cases would be facilitated by a pin and grommet fastener that can accommodate a significant amount of pin offset in both the X and Y directions during insertion into the pin retaining aperture of the grommet.

In addition, pin and grommet fasteners enabling such two-dimensional offset typically include multiple paths by which water, dirt, or other contaminants can readily pass through the aperture of a component in which such a grommet is mounted. One infiltration path can be between the grommet and the panel. Another infiltration path can be between the multiple components of the grommet itself, which are required to enable such two-dimensional offset. Other infiltration paths can be through the grommet component enabling offset in the X direction, or through the grommet component enabling offset in the Y direction, or through both. The components of such two-dimensional offset grommets typically include numerous extending elements that typically require adjacent openings through the components for molding purposes, making it difficult to seal all possible infiltration paths through the grommet.

SUMMARY

This section provides a general summary of the disclosure, and is not a comprehensive disclosure of its full scope or all of its features.

In accordance with one aspect of the present disclosure, a water resistant pin and grommet fastener is provided for mounting in an aperture of a first component and receiving a pin extending from a second component to couple the first and second components together. The pin can include a pin retention groove or protrusion. The grommet can include an inner housing having inner housing walls defining a pin retaining receptacle elongated in an X-direction with entry ramps extending parallel to the X-direction and an inner housing flange that can have an inner housing retaining surface. In addition, a cooperating pin retention groove or protrusion can be designed to retain the pin retention groove or protrusion. The grommet can include an outer housing having outer housing walls defining an enclosed interior extending from an outer housing flange. The outer housing flange can include a cooperating inner housing retaining surface. Resilient retention wings can extend outwardly from the outer housing walls without providing adjacent openings through the outer housing walls and can be designed to couple the outer housing to the first component when the outer housing is mounted within the aperture of the first component. A water-resistant seal that can be positioned between the outer housing flange and the first component and designed to resist water penetration between the outer housing and the first component when the outer housing is coupled to the first component by the plurality of resilient wings. Centering blades can be provided within the enclosed interior between the inner and outer housings and can extend to locate the pin retaining receptacle of the inner housing in a central position within the enclosed interior of the outer housing in a Y-direction prior to insertion of the pin into the pin retention receptacle. The centering blades can be movable in the Y-direction to permit the pin retaining receptacle of the inner housing to move to a non-central position relative to the housing in the Y-direction as a result of the inner housing moving the centering blades during insertion of the pin into the pin receiving receptacle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 29 is an exploded perspective view illustrating an alternative interlocking structure between the inner and outer housings that is useful with any of the example embodiments.

FIG. 30 is a perspective view with the inner and outer housings of FIG. 29 in an intermediate coupling position.

FIG. 31 is a perspective view with the inner and outer housings of FIG. 29 in a coupled position Corresponding reference numerals indicate corresponding parts throughout the several views of the drawings.

DETAILED DESCRIPTION

Example embodiments will now be described more fully with reference to the accompanying drawings.

Figure 1:
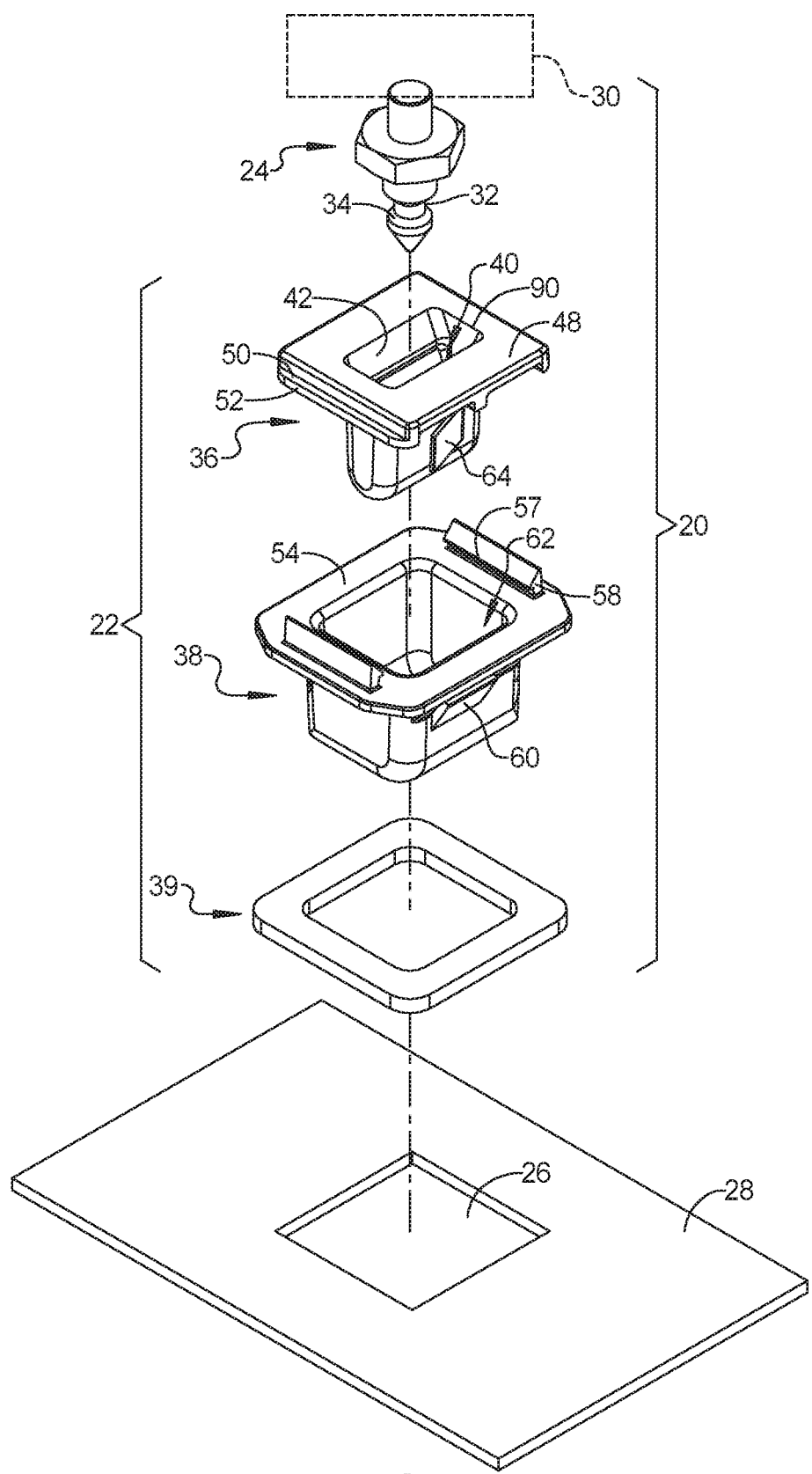
FIG. 1 is an exploded perspective view including a first example embodiment of a pin and grommet fastener in accordance with the present disclosure.
Figure 2:
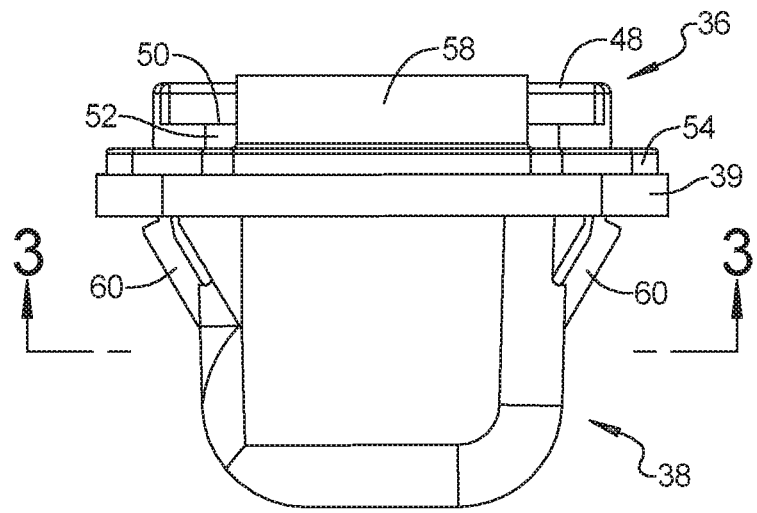
FIG. 2 is a side elevation view of the first example pin and grommet fastener of FIG. 1.
Figure 3:
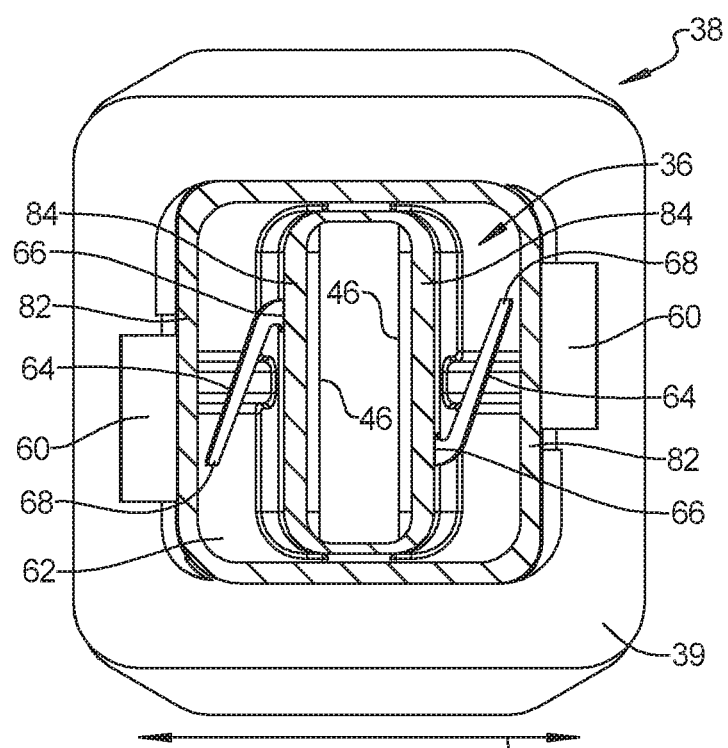
FIG. 3 is a cross-section view along line 3-3 of FIG. 2.
Figure 4:
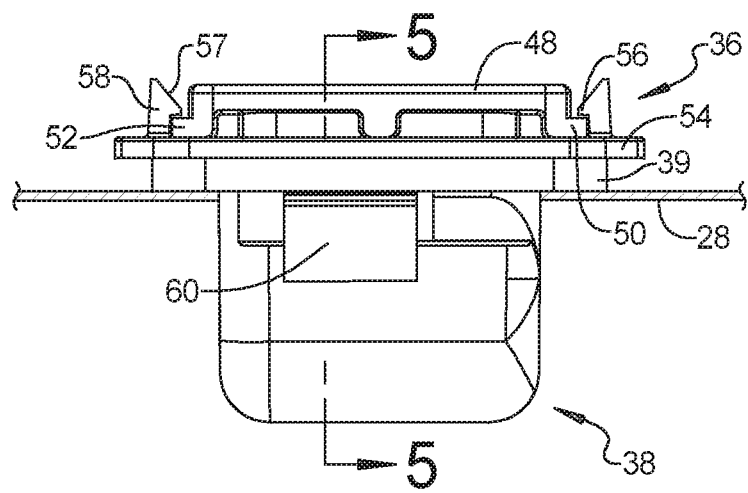
FIG. 4 is another side elevation view of the first example pin and grommet fastener of FIG. 1 and including the first component in cross-section.
Figure 5:
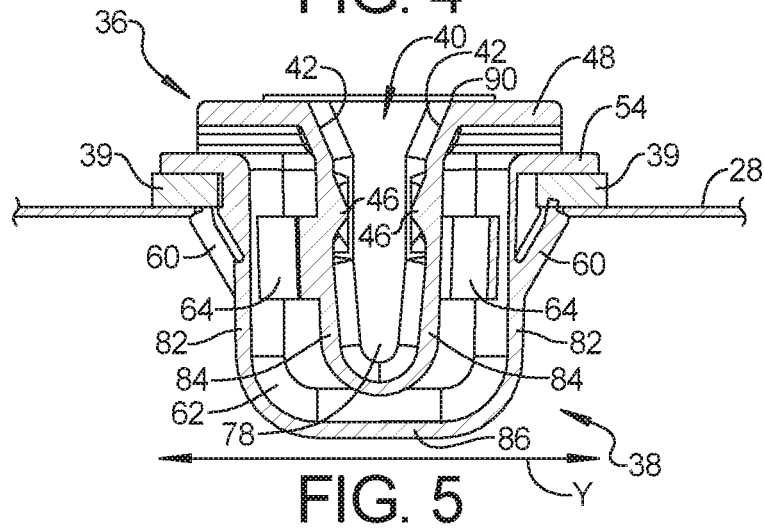
FIG. 5 is a cross-section view along line 5-5 of FIG. 4.
Figure 6:
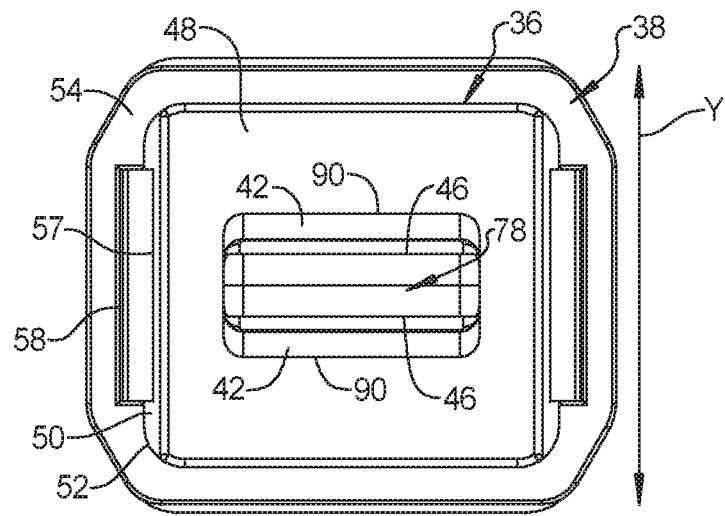
FIG. 6 is a top plan view of the first example pin and grommet fastener of FIG. 1.
Figure 7:
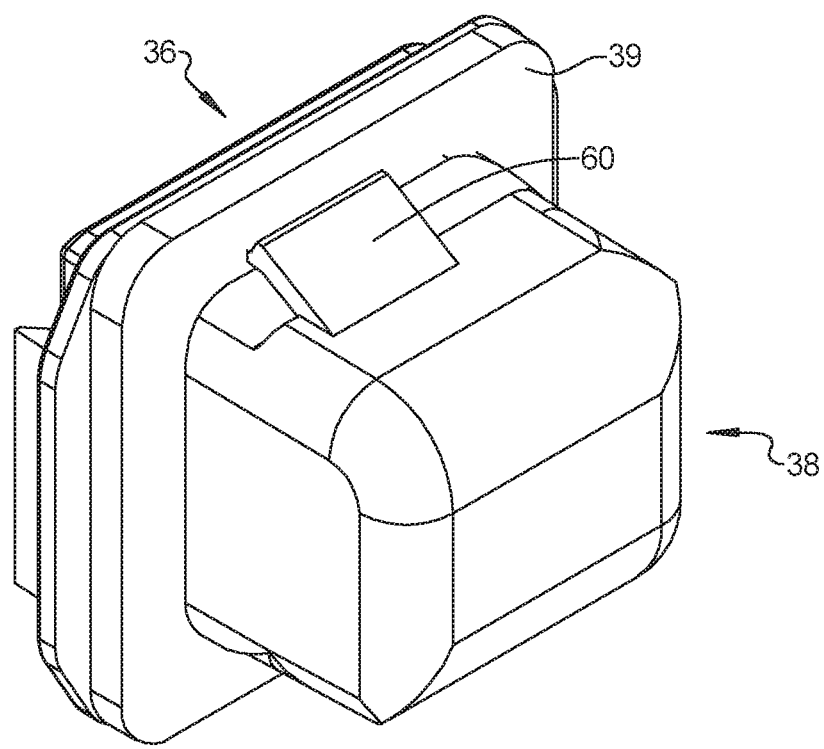
FIG. 7 is a perspective view of the first example pin and grommet fastener of FIG. 1.
Figure 8:
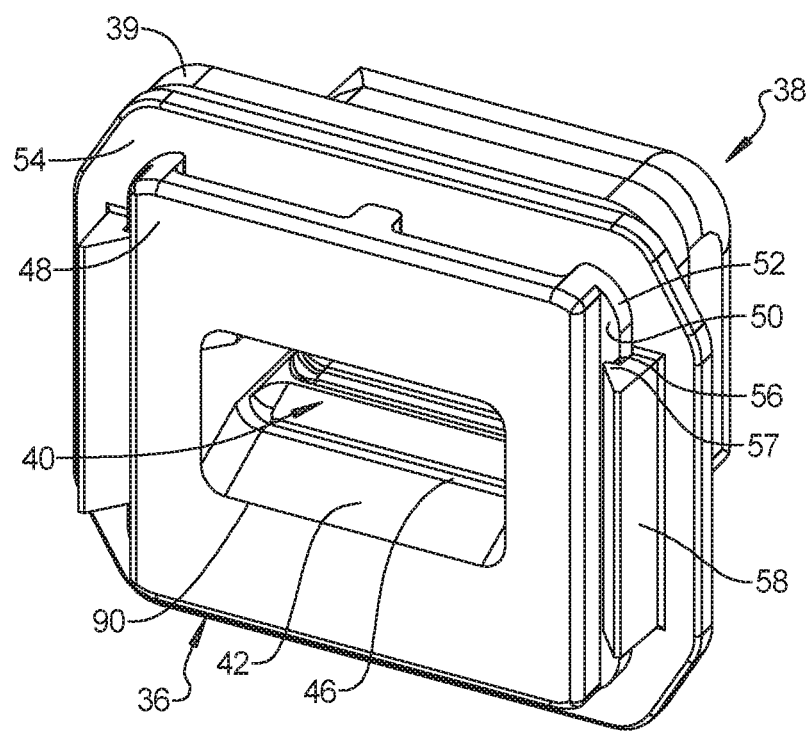
FIG. 8 is another perspective view of the first example pin and grommet fastener of FIG. 1.

FIGS. 1-8 illustrate one example embodiment of a pin and grommet fastener 20 in accordance with the present disclosure. The grommet 22 is mountable in an aperture 26 of a first component 28 to receive the pin 24 extending from a second component 30 to couple the first and second components, 28 and 30, respectively, together. The first component 28 can be a body panel of a motor vehicle with a number of grommets 22 couplingly mounted in apertures 26 thereof, and the second component 30 can be a headlight assembly from which a corresponding number of pins extend. The pin 24 can include a retention groove 32. Additionally or alternatively, the pin 24 can include a retention protrusion 34.

The grommet 22 includes an inner housing 36, an outer housing 38, and a water-resistant seal 39. The inner housing 36 has inner housing walls 84 that define a pin retaining receptacle 40 elongated in an X-direction. The pin retaining receptacle 40 can include entry ramps 42 extending parallel to the X-direction. A cooperating pin retention protrusion 46 is positioned to engage the pin retention groove 32 and retain the pin 24 in the pin retention receptacle 40. Alternatively or additionally, a cooperating pin retention groove can be positioned to engage the pin retention protrusion 34 and retain the pin 24 in the pin retention receptacle 40.

The inner housing 36 can include an inner housing flange 48 that can extend laterally from an upper end of the inner housing walls 84. The inner housing flange 48 can have an inner housing retaining surface 50. Two inner housing retaining surfaces 50 of this embodiment are provided by respective upper peripheral portions 52 of an edge of the inner housing flange 48. The outer housing 38 can have an outer housing flange 54 having cooperating inner housing retaining surfaces 56. Two cooperating inner housing retaining surfaces 56 of this embodiment are provided by protrusions 57 extending from posts 58 extending from the outer housing flange 54.

The outer housing 38 can have a plurality of resilient component retention wings 60 positioned to retain the outer housing 38 to the first component 28 when the outer housing is mounted within the aperture 26 of the first component 28. The outer housing flange 54 can extend laterally around an entire periphery of the outer housing walls 82, and the water-resistant seal 39 can extend around the entire periphery of the outer housing walls 82 adjacent the outer housing flange 54. The retention wings 60 are positioned to enable the water resistant seal 39 to seal between the outer housing flange 54 and the first component 28 when the outer housing 38 is mounted within the aperture 26 of the first component 28. In addition, the retention wings 60 are formed to extend from the outer housing walls 82 without requiring any associated adjacent openings through the outer housing walls 82.

The outer housing 38 has outer housing side walls 82 and end wall 86 that together define an enclosed or sealed interior 62 extending from the outer housing flange 54. Thus, the outer housing walls 82 extending from the outer housing flange 54 can define a bucket shape. The water resistant seal 39 helps insure water or other contaminants do not migrate through the aperture 26 of the first component 28 by traveling between the outer housing flange 54 and the outer surface of the first component 28. The enclosed interior 62 defined by the outer housing walls 82 helps insure water or other contaminants do not migrate through the aperture 26 of the first component 28 by traveling between the inner housing 36 and the outer housing 38 or through openings of the inner housing 36. Because the enclosed interior 62 of the outer housing 38 prevents further migration of water or contaminants, they are unable to migrate through the aperture 26 of the first component 28.

Similarly, the inner housing 36 can have outer housing side walls 84 that are joined together to define an enclosed or sealed interior 78 extending from the inner housing flange 48. Thus, the inner housing walls 84 extending from the inner housing flange 48 can define a bucket shape. The enclosed interior 78 defined by the inner housing walls 84 can help insure water or other contaminants do not migrate through the aperture 26 of the first component 28 by traveling through openings of the inner housing 36 and into the outer housing 38. Instead, any water that migrates into the enclosed interior 78 of the inner housing 36 is retained therein or redirected back out of the opening 90 of the inner housing 36. Thus, water or other contaminants is unable to migrate through the aperture 26 of the first component 28 via passage through the interior 78 of the inner housing 36.

A plurality of centering blades 64 are provided within the enclosed interior 62 between the outer housing 38 and the inner housing 36. The centering blades 64 are positioned and extend to locate the pin retaining receptacle 40 in a central position (FIG. 5) within the enclosed interior 62 of the outer housing 38 in a Y-direction prior to insertion of the pin 24 into the pin retention receptacle 40. The centering blades 64 can be flexible enough to move in the Y-direction to permit the pin retaining receptacle 40 to move to a non-central position in the Y-direction (positive or negative) relative to the outer housing 38 as a result of the inner housing 36 causing flexing and moving of the centering blades 64 during insertion of the pin 24 into the pin receiving receptacle 40.

When the pin 24 is offset from the pin retaining receptacle 40 in the Y-direction, it engages against one of the angled entry ramps 42. Continued insertion of the offset pin 24 transfers a force to the inner housing 36 via the engaged entry ramp 42. This causes the inner housing 36 to engage against and move the centering blade 64 adjacent to, or on the same side as, the engaged entry ramp 42. Thus, insertion of the offset pin 24 causes the pin retaining receptacle 40 to move to the non-central position in the Y-direction (positive or negative).

The inner housing retaining surface 50 can be provided by a peripheral portion 52 of an edge of the inner housing flange 48. Each cooperating inner housing retaining surface 56 can be provided by a protrusion 57 extending from a post 58. The posts 58 and protrusions 57 can provide slots or channels open toward or opposing each other and extending longitudinally in the Y-direction. When the posts 58 and protrusions 57 provide the inner housing retaining surface 50 adjacent the cooperating inner housing retaining surface 56, the inner housing 36 and the outer housing 38 are slidably coupled together to permit relative movement therebetween in the Y-direction. During such movement, the inner housing flange 48 and outer housing flange 54 are slidable against each other.

The centering blades 64 can extend within the enclosed interior 62 between the inner housing 36 and outer housing 38 to initially position the pin retention receptacle 40 of the inner housing in a central Y-direction position relative to the enclosed interior 62 of the outer housing 38. Initially retaining the pin retention receptacle 40 in this central Y-direction position provides initial certainty as to where outer opening 90 of the pin retention receptacle 40 is in the Y-direction. This enables reduced overall package size of the grommet 22 and facilitates insertion of the pin 24 into the grommet 22. For example, if the inner housing 36 was initially permitted to float or slide freely relative to the outer housing 38, the inner housing 36 could be initially positioned against a far right side wall 82 of the outer housing 38. Thus, in order to insure capture of a pin 24 inserted at a far left side of the outer opening 90 of the pin retention receptacle 40, this outer opening 90 would need to be much larger in the Y-direction. Because the acceptable angle of the entry ramps 42 is limited, this means the entry ramps 42 would need to be longer resulting in increased overall axial length of the pin retention receptacle 40 and, therefore, in increased overall axial length of the grommet 22 and of pin 24.

In contrast, the smaller sized outer opening 90 of the pin retention receptacle 40 is possible when the centering blades 64 position the pin retention receptacle 40 in a central Y-direction position relative to the outer housing 38. For example, in cases where multiple pin and grommet fasters 20 are used to join the first component 28 and the second component 30 together, the tolerances typically involve plus and minus dimensions from an ideal position or location. When in the central position, the outer opening 90 need only be large enough to accommodate the plus/minus tolerance dimensions. Similarly, in cases where a blind coupling of the pin 24 and grommet 22 together occurs, the repeatable relative central positioning of the pin retention receptacle 40 provides a known position of the outer opening 90 that a user or machine can rely upon when inserting the pin 24 into the grommet 22. Of course, the outer opening 90 is always maintained in a central X-direction position with the elongate pin retention receptacle 40 accommodating for tolerances or positional offsets in the X-direction.

Each centering blade 64 can have a first end 66 and a second end 68. As in the example embodiment of FIGS. 1-8, the inner housing 36 can comprise the centering blades 64 and the first end 66 can be coupled to the inner housing walls 84 and the second end 68 can be a free end. In addition, the centering blades 64 can extend generally laterally from the first end 66 to the second end 68 within the enclosed interior 62 of the outer housing 38.

Figure 9:
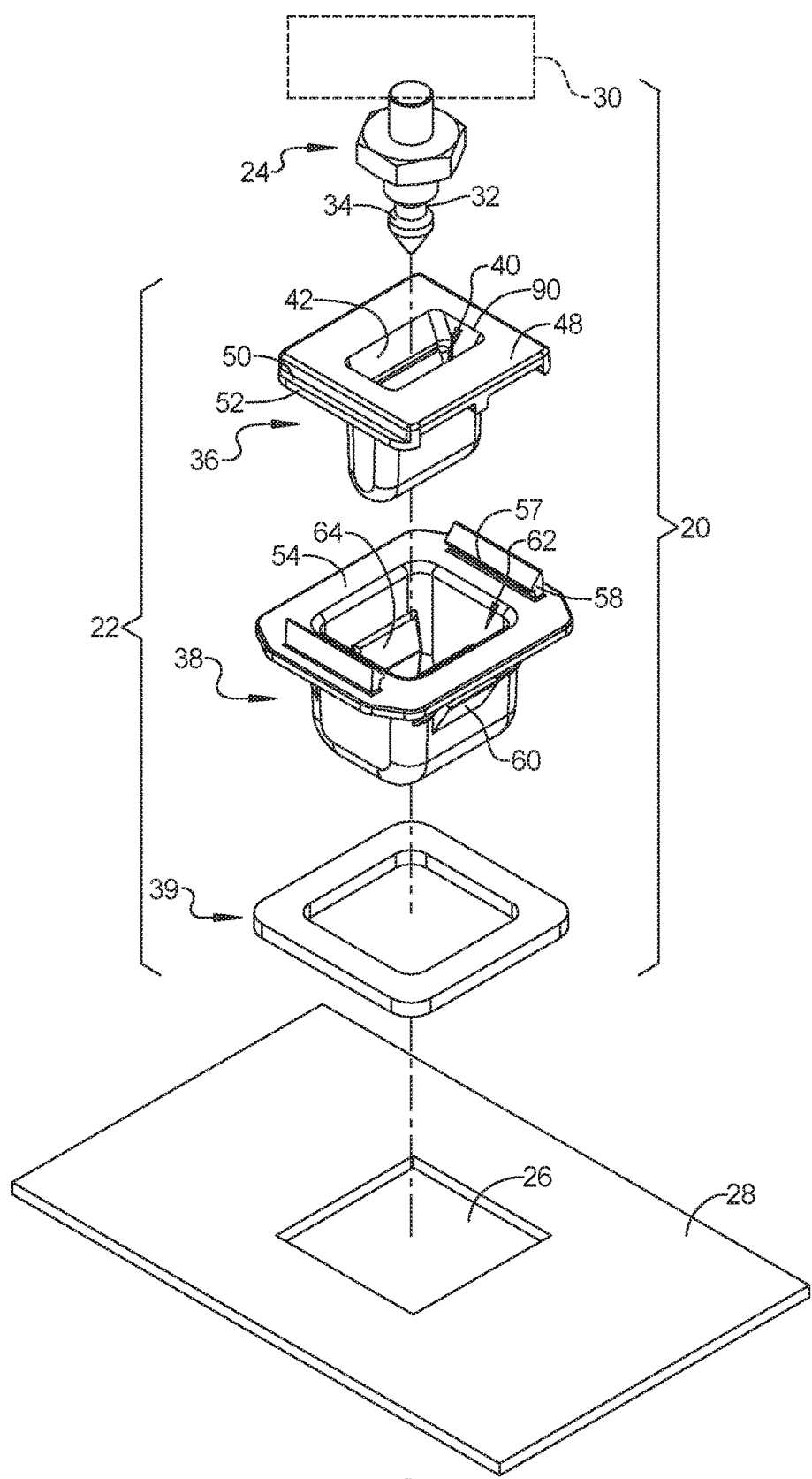
FIG. 9 is an exploded perspective view including a second example embodiment of a pin and grommet fastener in accordance with the present disclosure.
Figure 10:
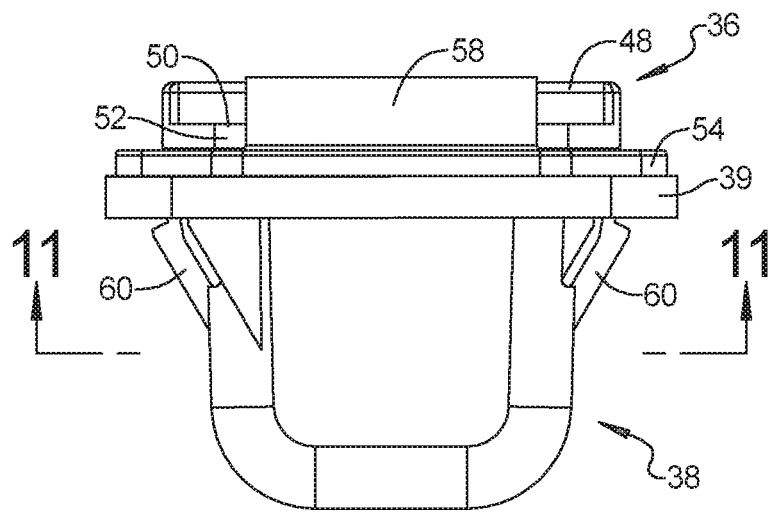
FIG. 10 is a side elevation view of the second example pin and grommet fastener of FIG. 9.
Figure 11:
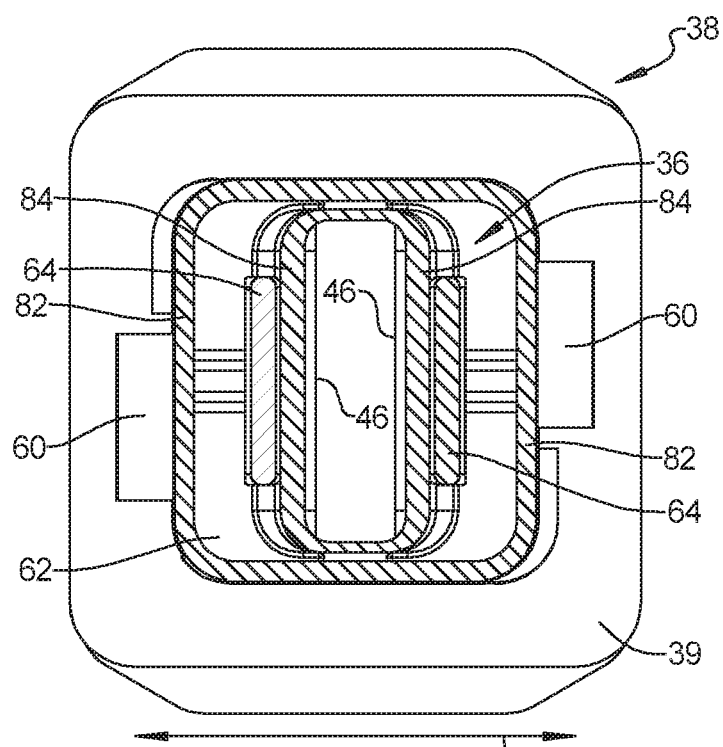
FIG. 11 is a cross-section view along line 11-11 of FIG. 10.
Figure 12:
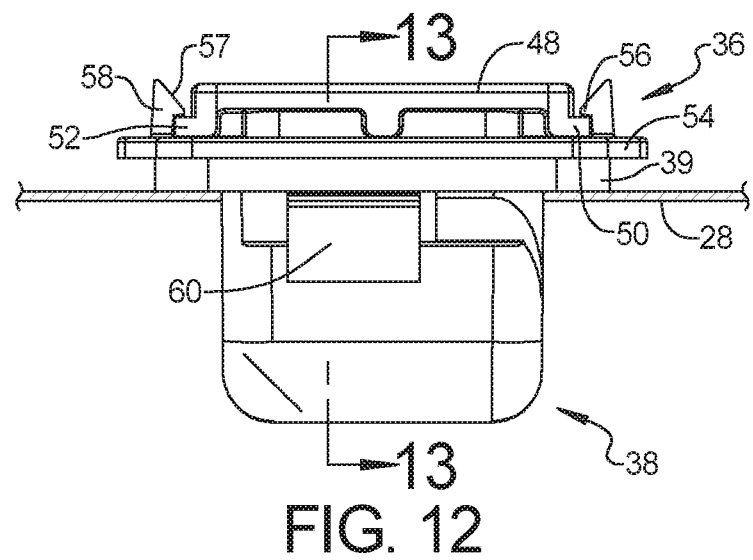
FIG. 12 is another side elevation view of the second example pin and grommet fastener of FIG. 9 and including the first component in cross-section.
Figure 13:
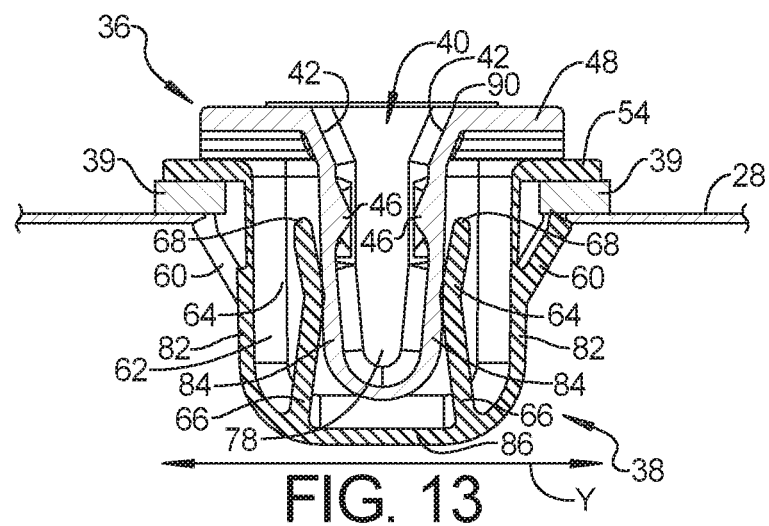
FIG. 13 is a cross-section view along line 13-13 of FIG. 12.

As in the example grommet 22 of FIGS. 9-13, the outer housing 38 can comprise the centering blades 64 and the first end 66 can be coupled to the end wall 86 of the outer housing and the second end 68 can be a free end. In addition, the centering blades 64 can extend generally axially from the first end 66 to the second end 68 within the enclosed interior 62 of the outer housing 38.

Figure 14:
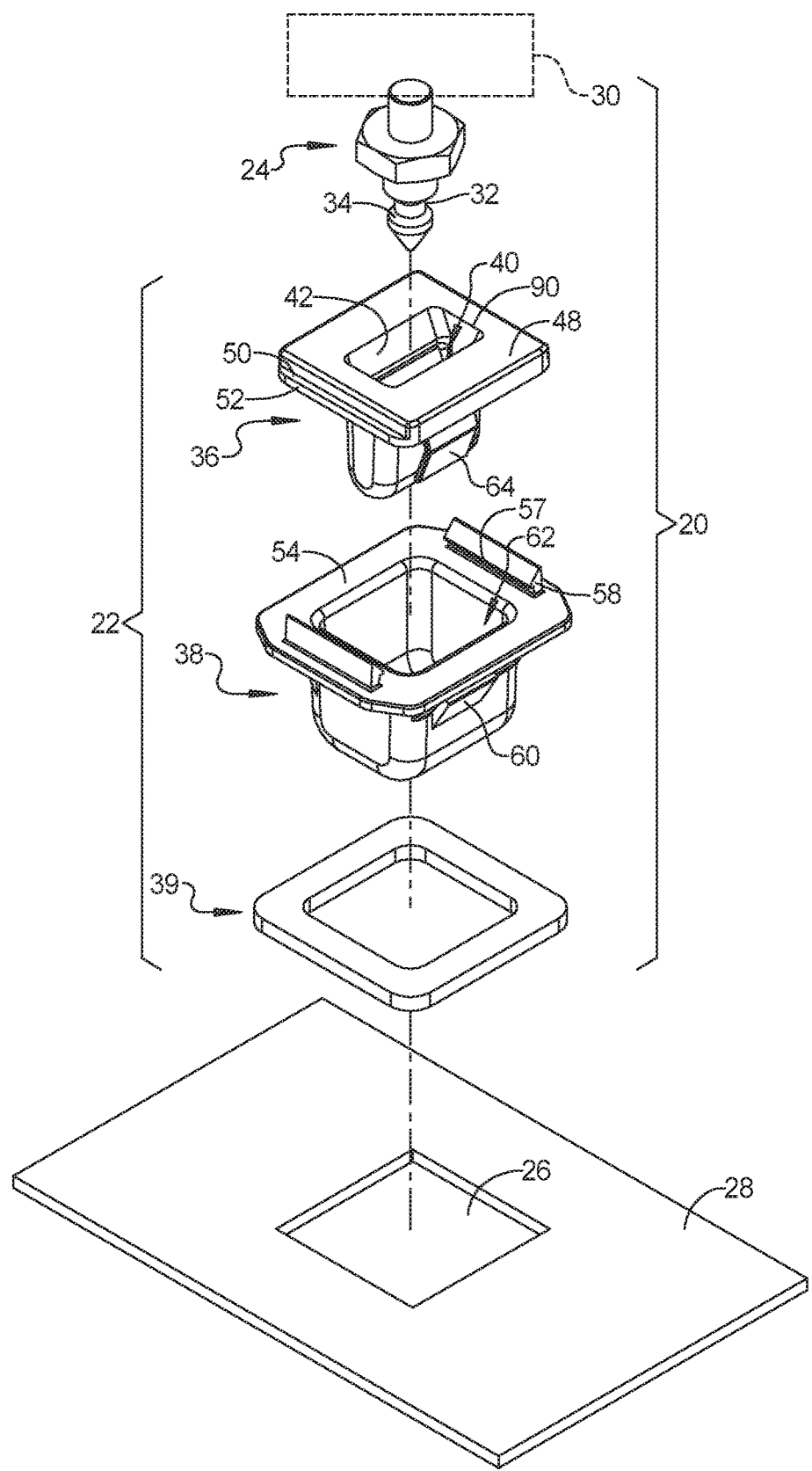
FIG. 14 is an exploded perspective view including a third example embodiment of a pin and grommet fastener in accordance with the present disclosure.
Figure 15:
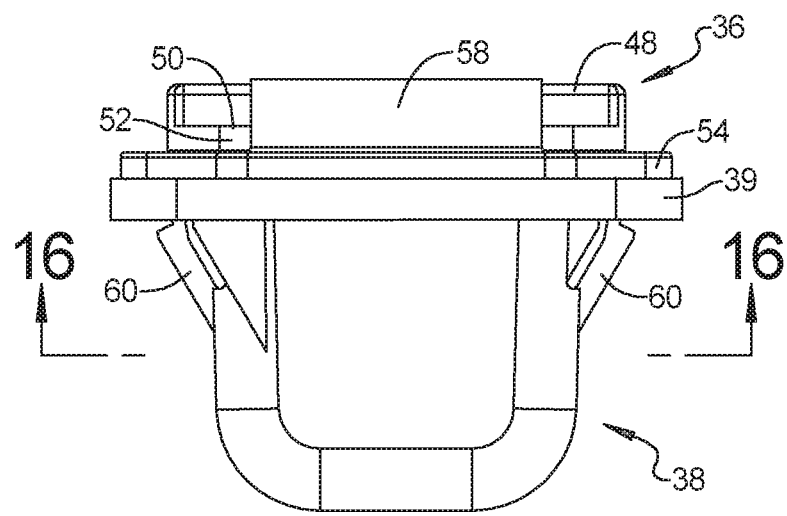
FIG. 15 is a side elevation view of the third example pin and grommet fastener of FIG. 14.
Figure 16:
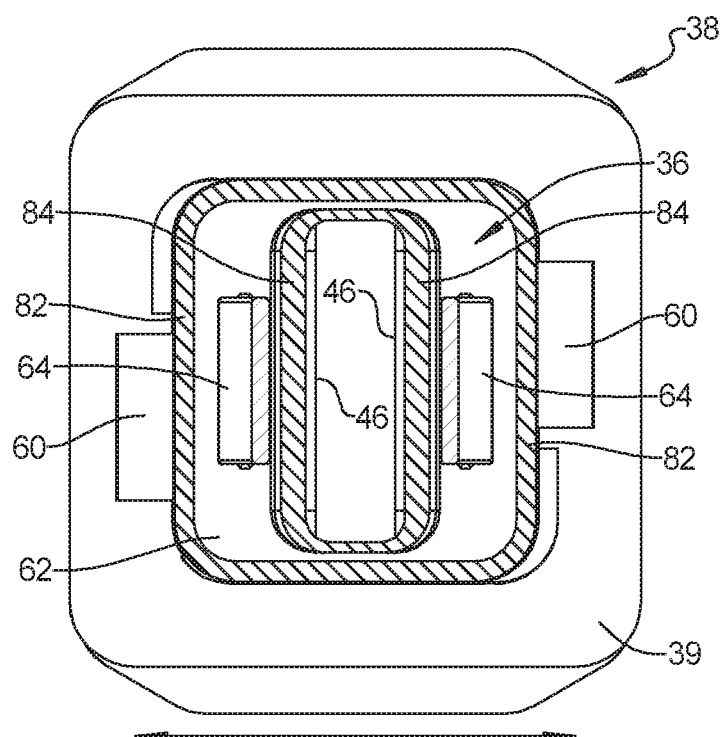
FIG. 16 is a cross-section view along line 16-16 of FIG. 15.
Figure 17:
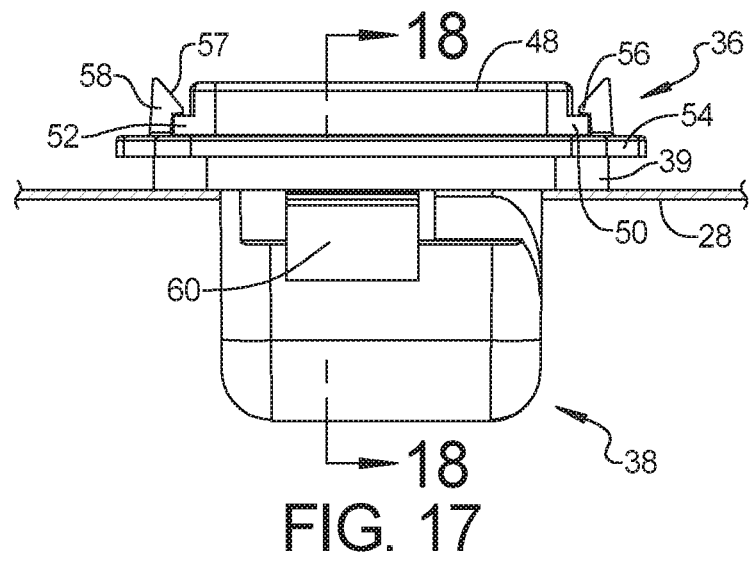
FIG. 17 is another side elevation view of the third example pin and grommet fastener of FIG. 14 and including the first component in cross-section.
Figure 18:
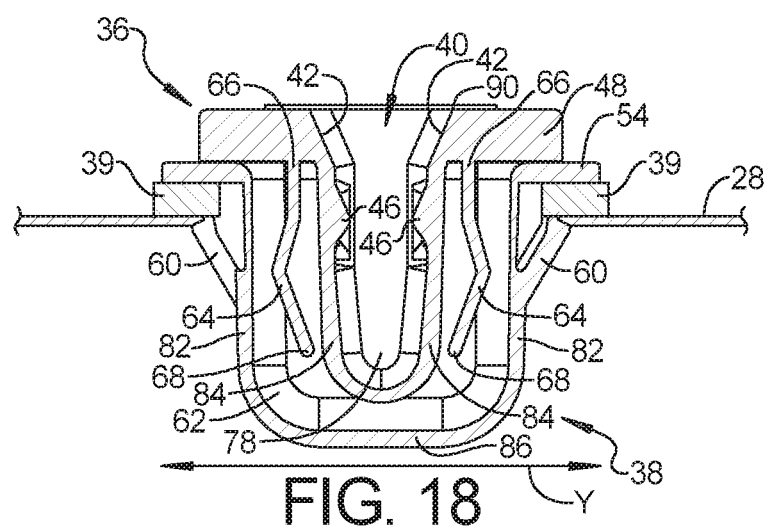
FIG. 18 is a cross-section view along line 18-18 of FIG. 17.

As in the example grommet 22 of FIGS. 14-18, the inner housing 36 can comprise the centering blades 64 and the first end 66 can be coupled to the flange 48 of the inner housing 36 and the second end 68 can be a free end. In addition, the centering blades 64 can extend generally axially from the first end 66 to the second end 68 within the enclosed interior 62 of the outer housing 38.

Figure 19:
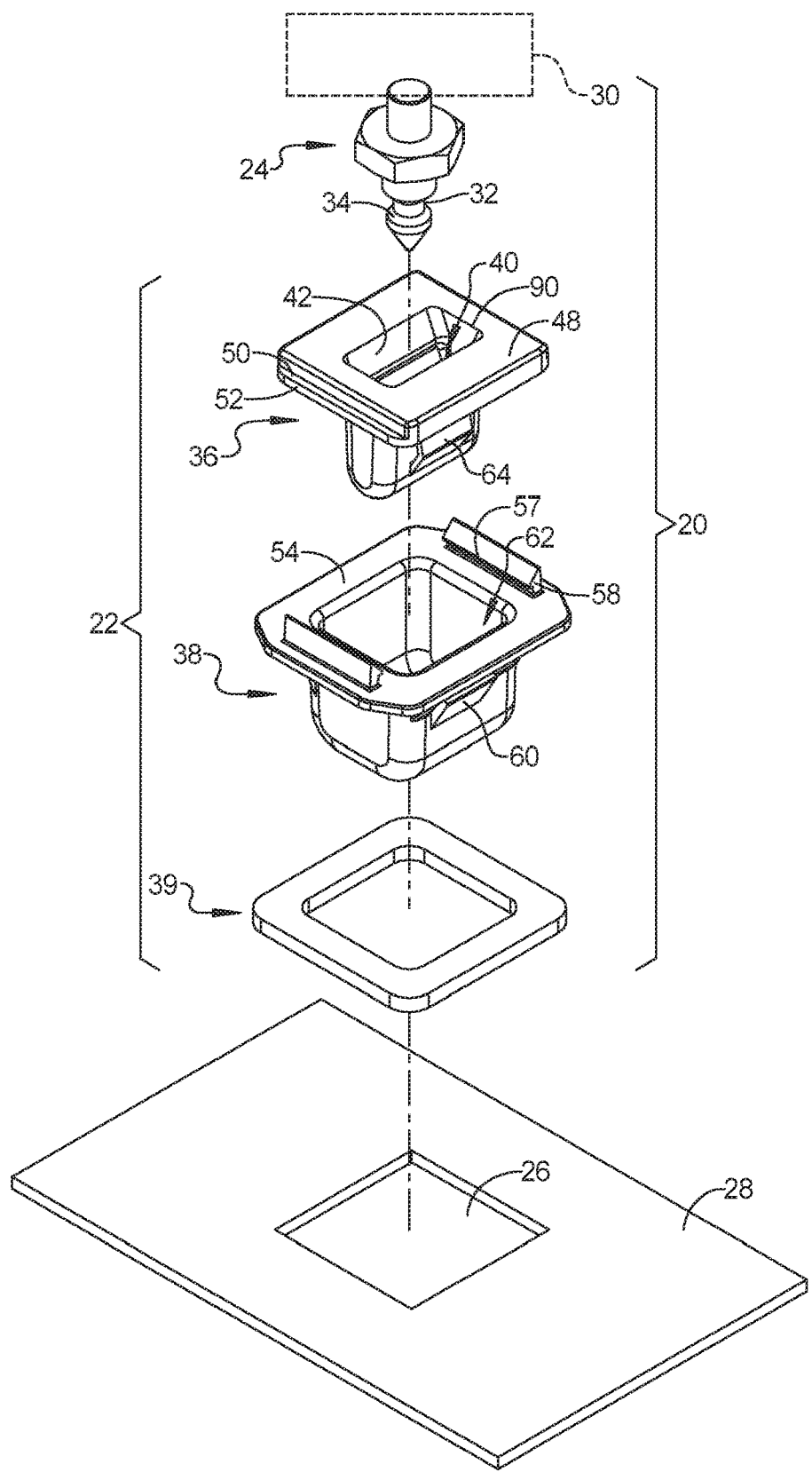
FIG. 19 is an exploded perspective view including a fourth example embodiment of a pin and grommet fastener in accordance with the present disclosure.
Figure 20:
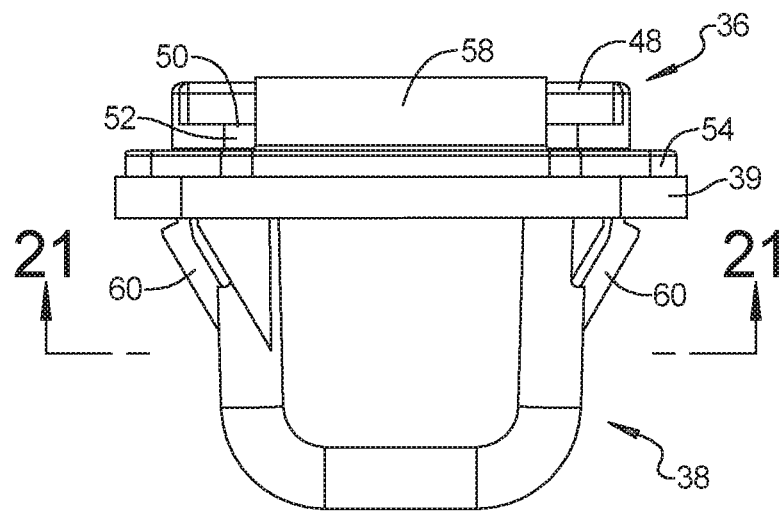
FIG. 20 is a side elevation view of the fourth example pin and grommet fastener of FIG. 19.
Figure 21:
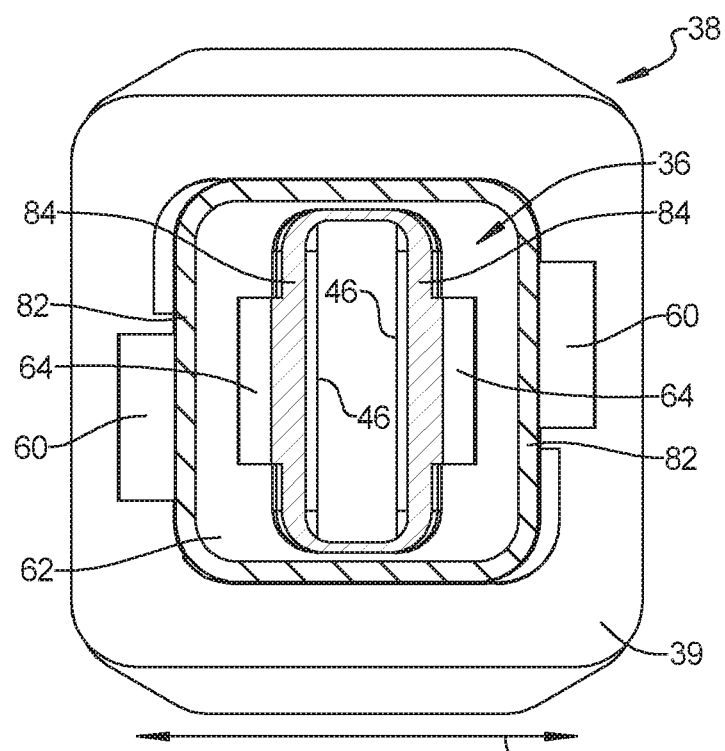
FIG. 21 is a cross-section view along line 21-21 of FIG. 20.
Figure 22:
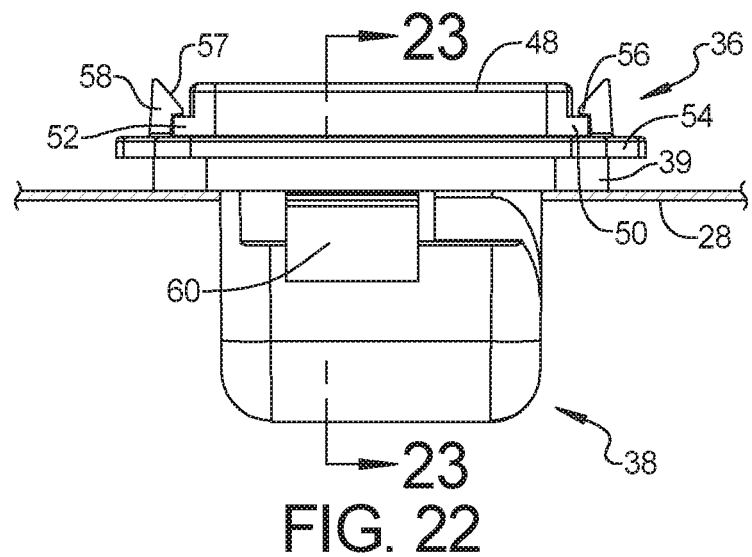
FIG. 22 is another side elevation view of the fourth example pin and grommet fastener of FIG. 19 and including the first component in cross-section.
Figure 23:
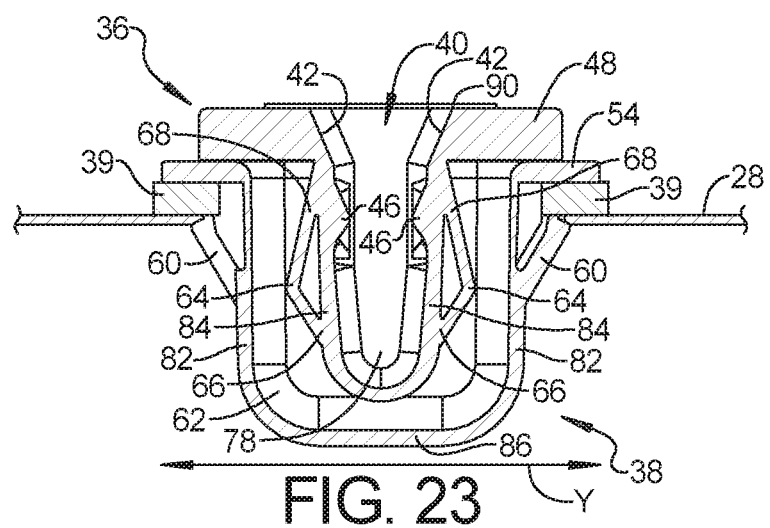
FIG. 23 is a cross-section view along line 23-23 of FIG. 22.

As in the example grommet 22 of FIGS. 19-23, the inner housing 36 can comprise the centering blades 64 and both the first end 66 and the second end can be coupled to the side walls 84 of the inner housing 36. In addition, the centering blades 64 can extend generally axially from the first end 66 to the second end 68 within the enclosed interior 62 of the outer housing 38.

Figure 24:
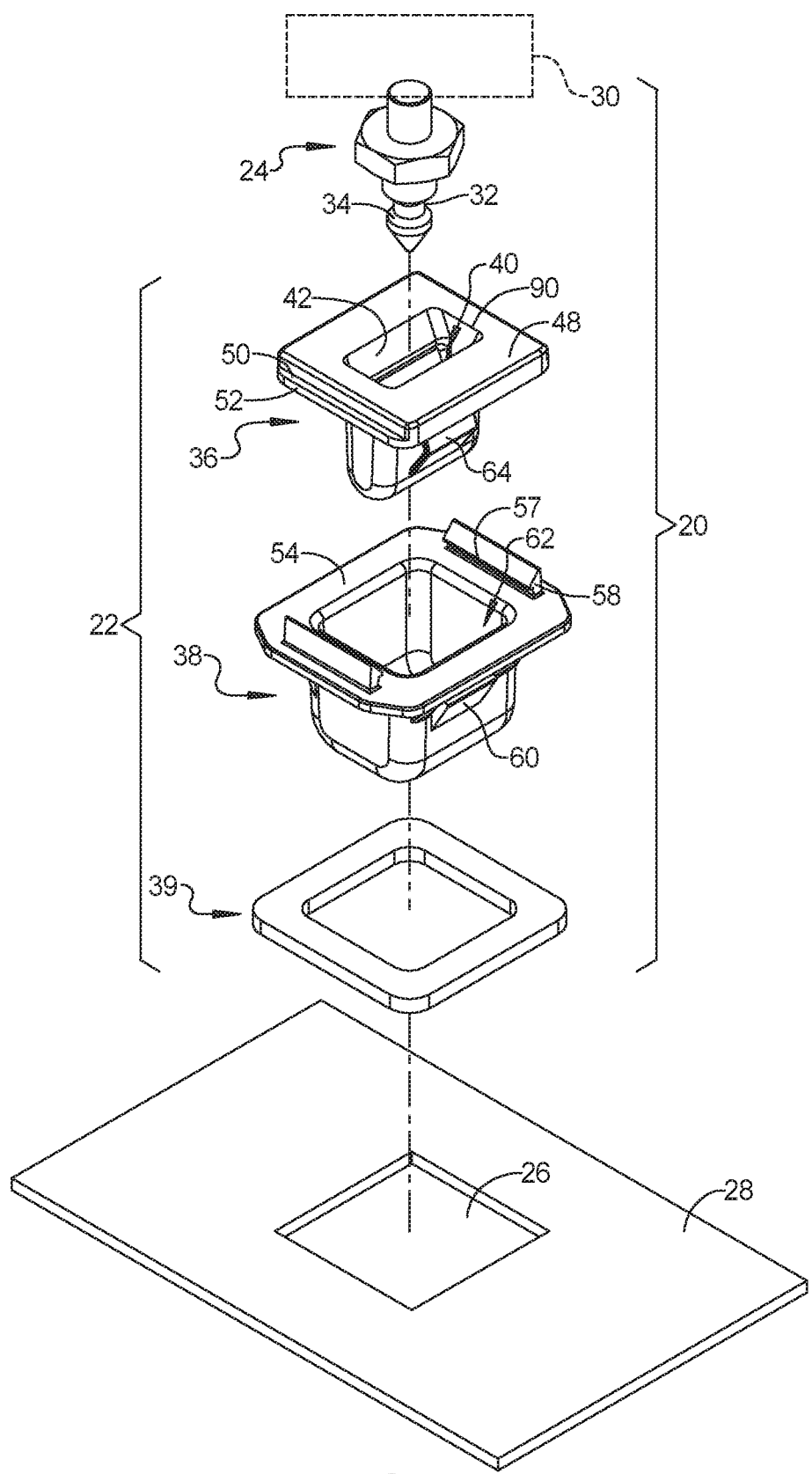
FIG. 24 is an exploded perspective view including a fifth example embodiment of a pin and grommet fastener in accordance with the present disclosure.
Figure 25:
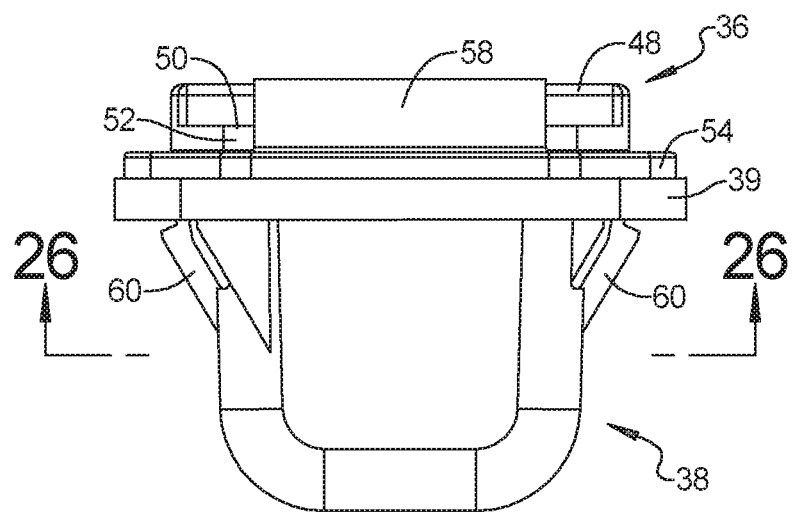
FIG. 25 is a side elevation view of the fifth example pin and grommet fastener of FIG. 24.
Figure 26:
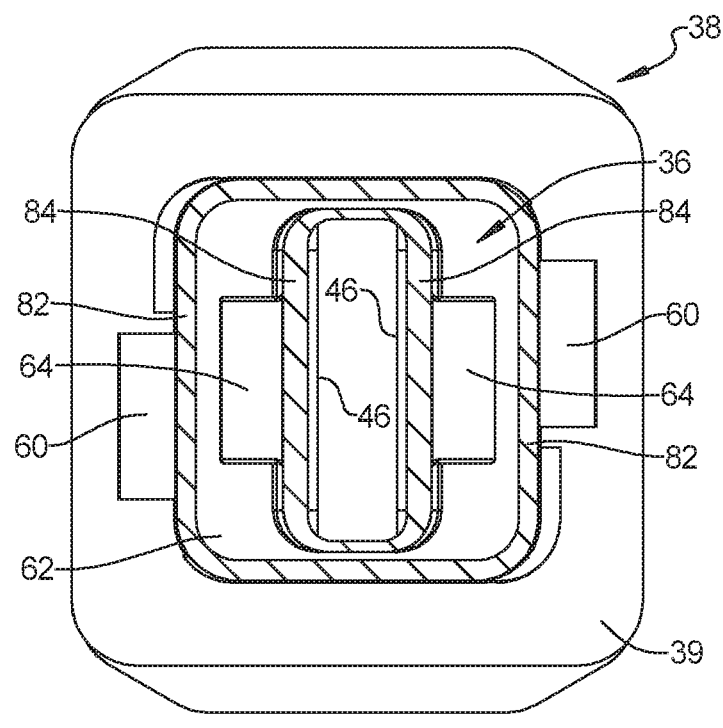
FIG. 26 is a cross-section view along line 26-26 of FIG. 25.
Figure 27:
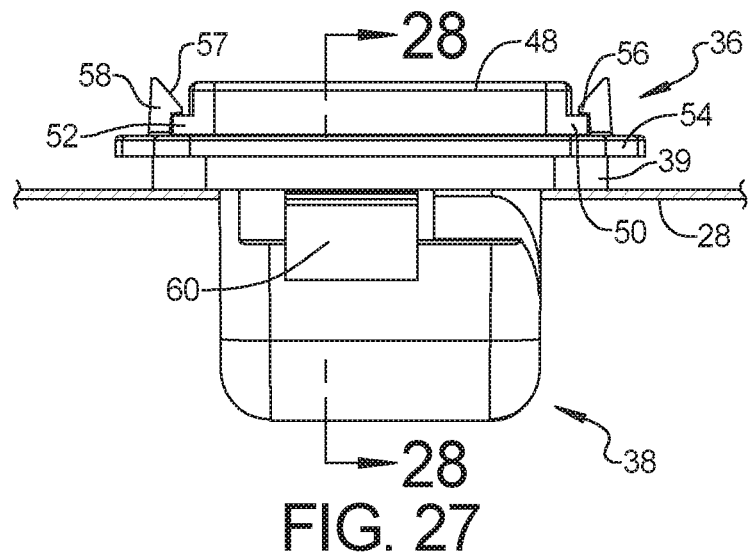
FIG. 27 is another side elevation view of the fifth example pin and grommet fastener of FIG. 24 and including the first component in cross-section.
Figure 28:
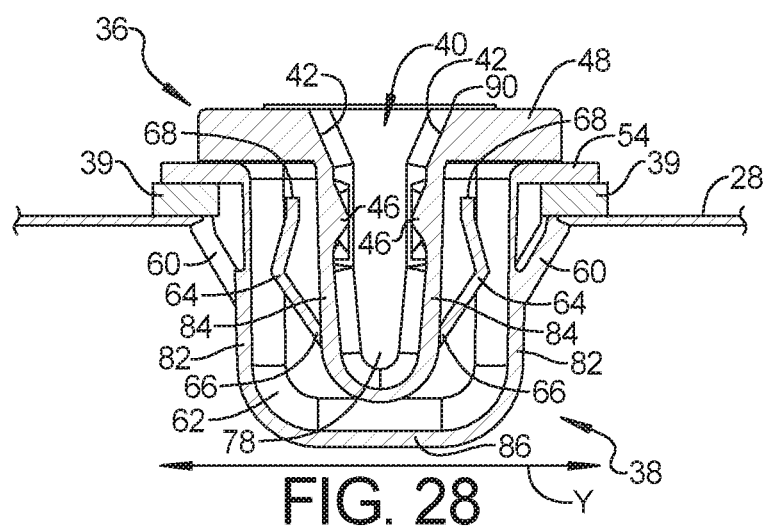
FIG. 28 is a cross-section view along line 28-28 of FIG. 27.

As in the example grommet 22 of FIGS. 24-28, the inner housing 36 can comprise the centering blades 64 and the first end 66 can be coupled to the side walls 84 of the inner housing 36 and the second end 68 can be a free end. In addition, the centering blades 64 can extend generally axially from the first end 66 to the second end 68 within the enclosed interior 62 of the outer housing 38.

In each of the above example grommets 22, the centering blades 64 can be resilient. For example, the centering blades 64 can be capable of biasing the inner housing 36 toward the central position even after the inner housing has been moved to the non-central position. Additionally or alternatively, the centering blades 64 can be thin, foldable, or otherwise collapsible. For example, the centering blades 64 can be capable of collapsing against the inner housing 36, the outer housing 38, or both to increase the distance between the central and non-central positions. Additionally or alternatively, the centering blades 64 can be frangible. For example, the centering blades 64 can ultimately break, completely or partially, as the inner housing 36 moves from the central to the non-central position. The frangible centering blades 64 can be made of a brittle material, enabling them to break. Additionally or alternatively, the frangible centering blades 64 can have a weakened area enabling them to bend or break.

In each of the above example grommets 22, the posts 58, including protrusions 57 of the outer housing 38, can be resilient or flexible, enabling a snap fit coupling between the protrusions 57 of the outer housing 38 and the peripheral portions 52 of the inner housing 36. The protrusions 57 of the outer housing 38, or the peripheral portions 52 of the inner housing 36, or both, can include angled surfaces to facilitate such a snap fit coupling.

Alternatively, in each of the above example grommets 22, the posts 58 can be non-flexible, and can enable a rotational coupling between the protrusions 57 of the outer housing 38 and the peripheral portions 52 of the inner housing 38. For example, as illustrated in FIGS. 29-31, the inner housing 36 can be six-sided with opposite diagonal sides spaced from each other at a distance that is equal or less than the distance between the protrusions. Thus, the inner housing 26 can be rotated to an intermediate coupling orientation (FIGS. 29 and 30) relative to the outer housing 38 in which the peripheral portions 52 of the inner housing can be positioned below the protrusions of the outer housing 38 in an intermediate coupling position (FIG. 30).

The inner housing 36 can be rotated relative to the outer housing 38 from this intermediate coupling orientation and position (FIG. 30) into a fully coupled orientation and position (FIG. 31). In the coupled position, the inner housing retaining surfaces 56 of the protrusions 57 engage the cooperating inner housing retaining surfaces 50 of the peripheral portions 52 to retain the inner housing flange 48 against the outer housing flange 54, while allowing sliding movement therebetween in the Y-direction.

A locking detent 70 can be provided to maintain the inner housing 36 in the coupled orientation and position relative to the outer housing 38. For example, a pair of locking detents 70 of the outer housing 38 can each include a ramped surface 72 and a locking surface 74 that engages against a cooperating locking surface 76 of the flange 48 of the inner housing 36 that extends in the Y-direction. The ramped surface 72 of each locking detent 70 facilitates rotational movement of the cooperating locking surface 76 of the inner housing 36 past the locking detent 70 where the locking surface 74 and cooperating locking surface 76 can engage against each other to prevent counter-rotation between the inner housing 36 and the outer housing 38, while allowing sliding movement therebetween in the Y-direction.

The features of FIGS. 29-30 are illustrated herein using the inner and outer housing components of FIGS. 1-8, and therefor illustrate an embodiment in which these components with the coupling features of FIGS. 29-30 are included in FIGS. 1-8. Similarly, however, the features of FIGS. 29-30 are likewise illustrative of embodiments in which the coupling features of FIGS. 29-30 are included in each of the other embodiments of FIGS. 9-28.

Other non-flexible post coupling structures and processes are possible. For example, the outer housing 38 can be formed of two half components that can be coupled together around the inner housing 38 to capture the peripheral portions 52 of the inner housing with the posts 58 and protrusions 57 of the outer housing 38 as detailed in commonly assigned U.S. Patent Application Publication 2018/0128297, which published on May 10, 2018, the entirety of which is hereby incorporated herein by reference.

Associated methods should be apparent from the discussion above. For example, methods of manufacturing the pin and grommet fastener 20 can include molding a pin 24 and grommet 22 having any of the features or elements disclosed above, and assembling them together as described, including inserting the pin into the grommet. Methods of use or assembling first and second components, 28 and 30, respectively, together can include any of inserting the grommet 22 into the aperture 26 of the first component 28 and inserting a pin 24, coupled to the second component 30, into the pin retention receptacle 40. All associated methods can include inserting a pin offset in the X-direction and in the Y-direction into the pin retention receptacle 40 to cause the inner housing 36 to move in the Y-direction relative to the outer housing 38 as discussed above.

Numerous specific details are set forth such as examples of specific components, devices, and methods. It will be apparent to those skilled in the art that such specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. Terms such as "first," "second," and other numerical terms when used herein do not imply a sequence or relative importance unless clearly indicated by the context. Reference to the "X-direction" and the "Y-direction" herein relate to a two-dimensional coordinate system in a plane aligned with the flanges of the grommet. As used herein, "generally axially" means extending within the interior generally between top to bottom portions of the housing (e.g., generally perpendicular to a plane defined by the outer housing flange), and "generally laterally" means extending within the interior generally between two side portions (e.g., generally parallel to a plane defined by the outer housing flange). As used herein in relation to the posts, "non-flexible" means that the posts are not required to flex while coupling of the inner and outer housings together.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A water resistant pin and grommet fastener for mounting in an aperture of a first component and receiving a pin extending from a second component to couple the first and second components together comprising:
   a pin including a pin retention groove or protrusion;
   a grommet comprising:
      an inner housing having inner housing walls defining a pin retaining receptacle elongated in an X-direction with entry ramps extending parallel to the X-direction, a cooperating pin retention groove or protrusion designed to retain the pin retention groove or protrusion, and an inner housing flange having an inner housing retaining surface;

an outer housing having outer housing walls defining an enclosed interior extending from an outer housing flange, the outer housing flange including a cooperating inner housing retaining surface, and resilient retention wings extending outwardly from the outer housing walls without providing adjacent openings through the outer housing walls and designed to couple the outer housing to the first component when the outer housing is mounted within the aperture of the first component;

a water-resistant seal positionable between the outer housing flange and the first component and designed to resist water penetration between the outer housing and the first component when the outer housing is coupled to the first component by the plurality of resilient wings;

centering blades within the enclosed interior between the inner and outer housings and extending to locate the pin retaining receptacle of the inner housing in a central position within the enclosed interior of the outer housing in a Y-direction prior to insertion of the pin into the pin retention receptacle, wherein the centering blades are movable in the Y-direction to permit the pin retaining receptacle of the inner housing to move to a non-central position relative to the housing in the Y-direction as a result of the inner housing moving the centering blades during insertion of the pin into the pin receiving receptacle.

2. The pin and grommet fastener of claim 1, wherein the outer housing flange extends laterally around an entire periphery of the outer housing walls and the water-resistant seal extends around the entire periphery of the outer housing walls adjacent the outer housing flange.

3. The pin and grommet fastener of claim 1, wherein the inner housing comprises the centering blades.

4. The pin and grommet fastener of claim 1, wherein the inner housing comprises the centering blades, and the centering blades extend generally laterally from a first end at the inner housing walls to a free end.

5. The pin and grommet fastener of claim 1, wherein the inner housing comprises the centering blades, and the centering blades extend generally axially from a first end at the inner housing walls to a second end.

6. The pin and grommet fastener of claim 1, wherein the inner housing comprises the centering blades, and the centering blades extend generally axially from a first end at the inner housing flange to a second end.

7. The pin and grommet fastener of claim 1, wherein the outer housing comprises the centering blades, and the centering blades extend generally axially from a first end at the outer housing walls to a free end.

8. The pin and grommet fastener of claim 1, wherein the outer housing comprises the centering blades, and first and second ends of the centering blades are coupled to the inner housing walls.

9. The pin and grommet fastener of claim 1, wherein the outer housing comprises the centering blades, and first and second ends of the centering blades are coupled to the inner housing flange and the inner housing walls, respectively.

10. The pin and grommet fastener of claim 1, wherein the centering blades are flexible between an initial position corresponding to the central position and a second position corresponding to the non-central position.

11. The pin and grommet fastener of claim 1, wherein the centering blades are frangible between an initial position corresponding to the central position and a second position corresponding to the non-central position.

12. The pin and grommet fastener of claim 1, wherein an outer single-piece component comprises the outer housing and an inner single-piece component comprises the inner housing.

13. The pin and grommet fastener of claim 1, wherein the inner housing retaining surface is provided by a peripheral portion of an edge of the inner housing flange and the cooperating inner housing retaining surface is provided by a non-flexible post extending from the outer housing flange with a protrusion extending from the non-flexible post, and wherein the protrusion is positioned to capture the peripheral portion as the two half-components are rotated relative to each other.

14. The pin and grommet fastener of claim 13, wherein the outer housing flange comprises a locking detent including a locking surface positioned to engage a cooperating locking surface of the inner housing flange to prevent counter-rotation between the inner housing and the outer housing, while allowing sliding movement therebetween in the Y-direction.

15. The pin and grommet fastener of claim 14, wherein the locking detent comprises a ramped surface to facilitate rotational movement of the cooperating locking surface of the inner housing past the locking surface of the locking detent as the inner housing and the outer housing are axially rotated relative to each other.

16. The pin and grommet fastener of claim 13, wherein the inner housing flange has an upper surface, and wherein the protrusion and the non-flexible post are completely positioned below the upper surface when the inner housing is coupled to the outer housing.

* * * * *